Aug. 15, 1939.  D. R. HAYNES  2,169,693
AIR COOLING AND CIRCULATING DEVICE FOR VEHICLES
Filed Feb. 12, 1938
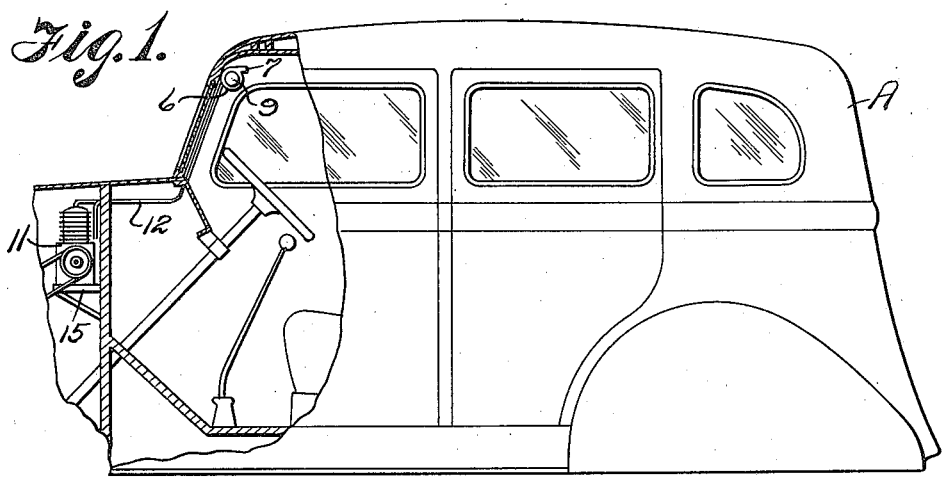
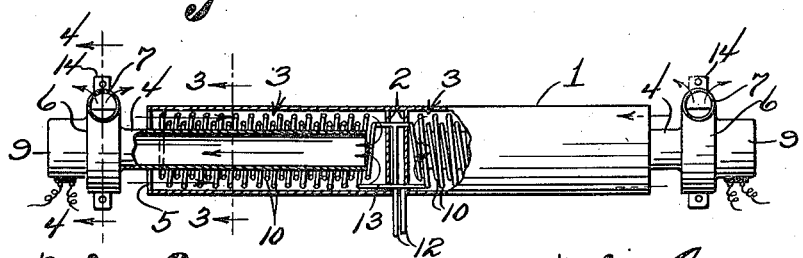
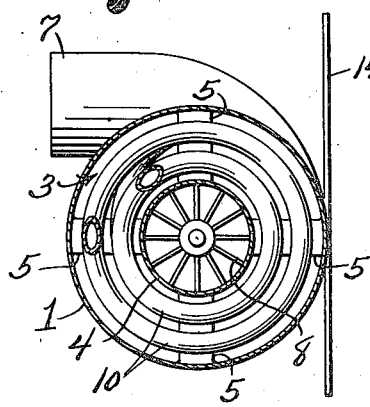
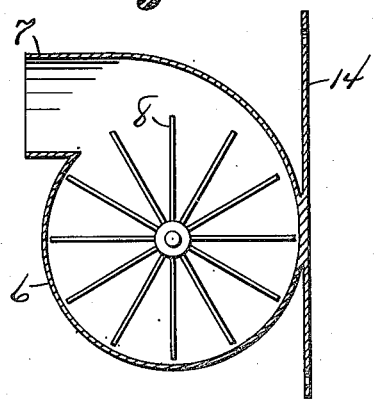
David R. Haynes
INVENTOR
BY Victor J. Evans & Co.
ATTORNEYS Patented Aug. 15, 1939

2,169,693

UNITED STATES PATENT OFFICE 2,169,693

AIR COOLING AND CIRCULATING DEVICE FOR VEHICLES

David R. Haynes, Burlington, Iowa

Application February 12, 1938, Serial No. 190,334

3 Claims. (Cl. 257—137)

This invention relates to air conditioning devices for motor vehicles, and its general object is to provide a cooling device that is primarily designed for introducing cool air under pressure at the upper portion of the body of a vehicle, so that the air will circulate throughout the body and thereby retain the same in a cool and comfortable condition.

A further object is to provide an air conditioning device for motor vehicles that can be readily installed therein, will take up minimum space, is simple in construction, inexpensive to manufacture and extremely efficient in operation, use and service.

This invention also consists in certain other features of construction and in the combination and arrangement of the several parts, to be hereinafter fully described, illustrated in the accompanying drawing and specifically pointed out in the appended claims.

In describing the invention in detail, reference will be had to the accompanying drawing wherein like characters denote like or corresponding parts throughout the several views, and in which:

Figure 1 is a fragmentary view illustrating my device installed in the body of a motor vehicle.

Figure 2 is a view partly in section of the device per se, with the exception of the compressor.

Figure 3 is a sectional view taken approximately on line 3—3 of Figure 2, looking in the direction of the arrows.

Figure 4 is a sectional view taken approximately on line 4—4 of Figure 2, looking in the direction of the arrows.

Referring to the drawing in detail, the letter A indicates the body of a motor vehicle and illustrates that my device introduces cooled air under pressure at the upper portion of the body, or in close proximity to the top thereof, and while the device is shown as being installed at the front of the body, it can be arranged at the rear thereof, or any other suitable place, providing their outlet means is disposed adjacent to the top of the body, as such is the important feature to bring about complete circulation of the air within the body.

The device as best shown in Figure 2, includes a cylinder 1 which provides a housing, and the cylinder has a pair of partitions 2 spaced from each other and arranged centrally therein to provide individual compartments 3.

The ends of the cylinder are open, and extending into each compartment through the open ends thereof are tubes 4 which are fixed centrally within the compartments by bracket strips 5 extending between the ends of the cylinder and the tubes, as best shown in Figure 3. The inner ends of the tubes terminate adjacent to the partitions, but ample space is provided between the inner ends of the tubes and the partitions to allow for the free passage of air.

The tubes extend outwardly from the outer ends of the cylinder and have formed on the outer ends thereof blower casings 6 that have outlet nozzles 7 formed on and extending tangentially therefrom, as best shown in Figures 3 and 4. Rotatably mounted in the casings are blower fans 8, and the casings have formed thereon motor housings 9 for the fans.

Surrounding the tubes 4, for disposal in inner and outer groups of convolutions, are cooling coils 10 for receiving a cooling medium from any suitable source, such as for instance a conventional compressor condenser expander system, in that the coils are shown as being connected to a compressor 11 of such a system, that also includes an expansion valve, not shown, and to which the coils are likewise connected by conduits 12, for the circulation of cooling fluid through the coils, as will be apparent, and the coils are interconnected by conduit portions 13 that extend through the partitions 2. It will be obvious that the refrigerating system also includes a condenser and other well known elements, but as the system forms no part of the present invention, it is deemed unnecessary to illustrate the same in its entirety.

Each of the blower casings have secured thereto a mounting bracket 14 for installing the device within the body, and the compressor of the system is preferably mounted upon a shelf 15 within the hood portion of the vehicle, as clearly shown in Figure 1, and is driven by any appropriate means in connection with the engine of the vehicle. The elements of the system, not shown are arranged and supported at any convenient places about the vehicle.

It will be noted from the arrows of Figure 2, that air is drawn through the ends of the cylinder or housing 1, for passage about the coils 10, so that it is cooled, thence the cooled air passes through the tubes 4 to the blower casings to be blown therefrom by the fans 8, with the result it will be seen that the air is not only cooled, but is caused to circulate throughout the body of the vehicle, especially in view of the fact that the device is arranged at the upper portion of the vehicle adjacent to the top thereof.

It is thought from the foregoing description that the advantages and novel features of the invention will be readily apparent.

It is to be understood that changes may be made in the construction and in the combination and arrangement of the several parts, provided that such changes fall within the scope of the appended claims.

What I claim is:

1. An air cooling and circulating device for motor vehicles, comprising a housing having open ends providing air inlets, partitions dividing the housing into separate compartments, cooling coils within each compartment, cooled air receiving tubes within the compartments and extending through the air inlets of the housing, blower means mounted on the outer ends of the tubes for drawing the cooled air therethrough and forcing the same from the blower means, and means for mounting the device within the body of the vehicle adjacent the top thereof for directing the cooled air along the upper portion of the body.

2. An air cooling and circulating device for a motor vehicle, comprising a housing having open ends providing air inlets, partitions arranged centrally within the housing and dividing the same into separate compartments, cooling coils within each compartment, cooled air receiving tubes within the compartments and extending through the inlets for disposal exteriorly thereof, said tubes having their inner ends spaced from the partitions to provide air passages, blower casings mounted on the outer ends of the tubes, motor driven fans within the blower casings for drawing the cooled air through the tubes and forcing the same through the blower casings, and means on the blower casings for mounting the device within the body of the vehicle adjacent the top thereof for directing the cooled air along the upper portion of the body.

3. An air cooling and circulating device for motor vehicles, comprising a cylindrical housing having open ends providing air inlets, cooling coils within the housing, cooled air receiving tubes within the housing and extending through the inlets, means for mounting the tubes centrally of the housing, blower casings mounted on the outer ends of the tubes, outlet nozzles for the blower casings and extending tangentially therefrom, motor driven fans within the casing for drawing the cooled air through the tubes and forcing the same through the nozzles, and brackets secured to the blower casings for mounting the device within the body of the vehicle adjacent the top thereof for directing the cooled air along the upper portion of the body.

DAVID R. HAYNES.